INVENTORS
HELMUT RICHTER
PETER WOHLFAHRT
PETER FUCHS
ARNO ARNDT

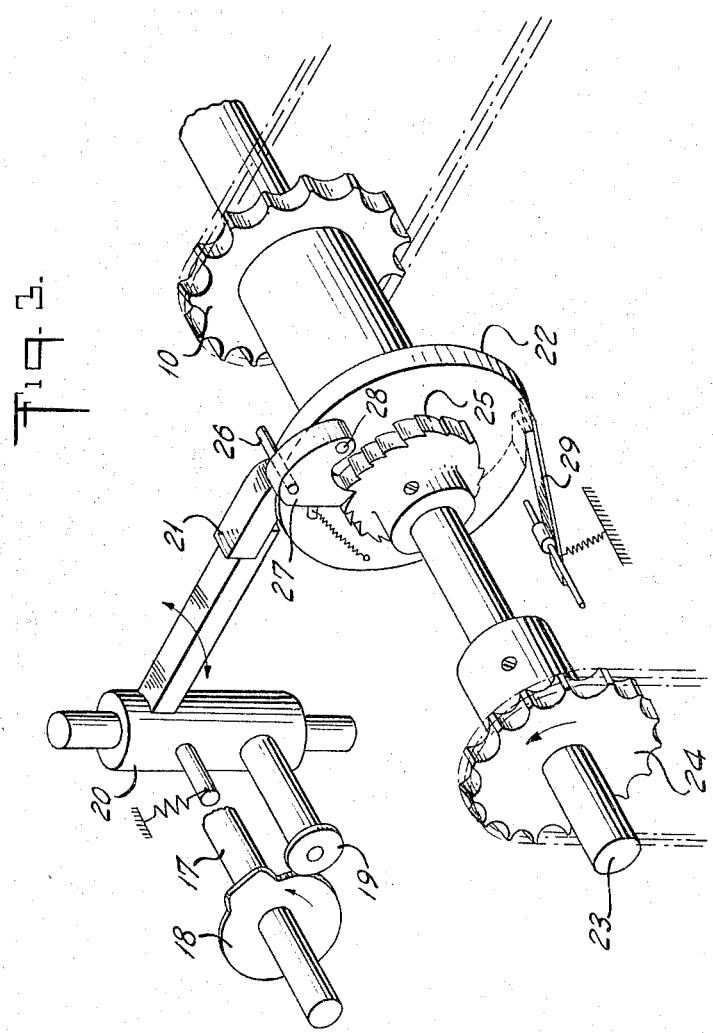

United States Patent Office 3,289,815
Patented Dec. 6, 1966

3,289,815
DEVICE FOR AUTOMATIC FEEDING OF DOUGH
FROM A CONVEYOR TO A RECEIVING STATION
Helmut Richter, Halle an der Saale, Peter Wohlfahrt,
Leipzig, and Peter Fuchs and Arno Arndt, Halle an der
Saale, Germany, assignors to Veb Vereinigte Bäckerei-
maschinenwerke, Halle an der Saale, Germany
Filed Aug. 9, 1965, Ser. No. 478,161
5 Claims. (Cl. 198—139)

This invention relates in general to an apparatus for automatically transporting dough pieces from a delivery belt to a movable or fixed removal station at which removal station the dough pieces are removed from the delivery belt and placed on baking trays, for example, tilting frames, boards, trays, further conveyor belts etc.

A known dough transporting device includes a conveyor belt which receives the dough pieces, and a removal station reciprocating transversely with respect to the conveyor belt. The movement of the removal station is performed with a high rate of speed due to the continuous movement of the conveyor belt.

The disadvantage of this device is the high rate of speed required to remove the dough pieces in a straight line. Therefore, the device cannot be used universally but only for flat dough pieces.

Another device for transporting dough pieces is known in which an endless belt having a tension loop is guided about rollers. The loop compensates the movement of the removal band during the pivotal movement of the device and facilitates the adjustment of respective chambers of a follower device. The band transports the dough pieces in one movement from the delivery belt to the above mentioned chambers, and is moved back to receive another dough piece. In other words, the known transporting device which is rather complicated in construction, transports the dough pieces one by one and not in a continuous manner.

An improvement of the last mentioned device is also known, in which the belt is first contracted—and after termination of the transport movement the belt is expanded and guided in a carrier mounted in the frame of the machine about an arresting cylinder, having a ratchet to prevent a return movement. The removal operation with the last mentioned device is arranged in a lengthwise selective manner by stepwise shifting cam discs of different sizes, whereby bolts of a rocker arm transmits the movement of the respective cam disc to the removal station by means of a curved portion of the cam disc. After the conveyor belt having been fully loaded with dough pieces, the lower level trays are returned while the upper level trays remain stationary.

The disadvantage of this device is based on the fact that when the upper level trays are stopped and the carrier is returned, the device does not operate continuously, and only a relatively short step by step movement of the belt is attained.

It is an object of the present invention to avoid the limitations of the above described machines, by providing a simpler and maintenance free apparatus.

It is a further object of this invention to provide an apparatus including a delivery belt having a long path of travel between a loading station and a removal station, and to effect the removal of the dough pieces in straight lines from the delivery belt onto the removal station.

A still further object of the present invention is that no complicated, expensive mechanisms have to be installed for changing the direction of movement of the delivery belt.

The transporting apparatus in accordance with the present invention comprises an endless belt; drive roller means operatively connected to said endless belt; driven chain means; a set of guide sprocket means operatively coupled to said driven chain means; tension roller means secured to said driven chain means and operatively coupled to said endless belt; carriage means secured to said driven chain means and adapted to move along a predetermined path therewith; guide means formed on said carriage means; a pair of driven sprockets laterally disposed with respect to each other along the path of movement of said carriage means; endless driven chain means carried by said pair of driven sprocket means; pin means secured to said endless driven chain means and adapted to cooperate with said guide means; driving sprocket means operatively connected to one of said pair of driven sprocket means; and switching means operatively connected to said drive sprocket means for effecting intermittent operation of said drive sprocket means, whereby said carriage means is reciprocated between two positions on said path in response to said intermittent operation of said drive sprocket means, said tension roller means and said endless belt passing therearound reciprocate between said loading and said receiving stations.

The switching mechanism for the intermittent on and off switching of the rotation of the drive sprocket may comprise mechanical, electrical, or hydraulically actuated mechanisms or a combination of them.

Furthermore, the belt is continuously actuated by a plurality of drive rollers. The guide rollers for the belt which are adjacent to the drive rollers are arranged so that the belt encompasses the drive rollers over a large angle along the surface thereof. The aforementioned features lead to economical useage of material as well as space. The dough pieces are removed continuously and in a straight line. It should be noted that the concept of the invention can be applied to long as well as short delivery paths.

The various features of novelty, which characterize the invention, are pointed out with particularity in the claims annexed to and forming a part of this specification. For a better understanding of the invention, its operating advantages and the specific objects attained by the use thereof reference should be had to the accompanying drawings and the descriptive matter, in which:

FIG. 3 shows the mechanical switching mechanism used in FIGS. 1 and 2.

Figure 1:
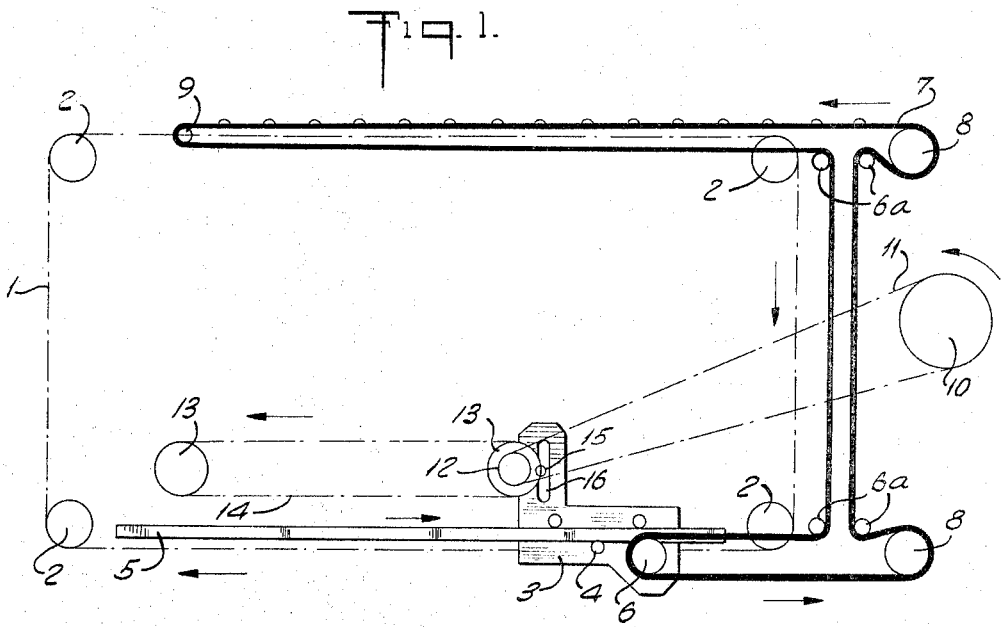
FIG. 1 is a side view of the apparatus in one position of the delivery belt thereof.
Figure 2:
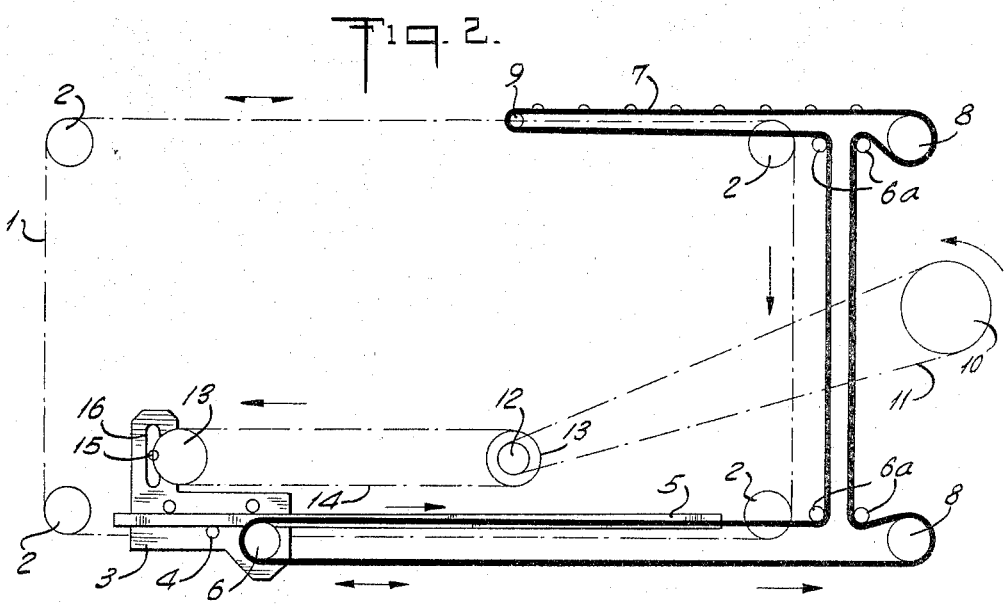
FIG. 2 is a side view similar to FIG. 1, showing the delivery belt in another position thereof.

Referring to FIG. 1, a chain assembly comprising a drive 1 is guided about a set of guide sprockets 2, which are four in the specific embodiment. End portions of the drive chain 1 are interconnected by means of a carriage 3. Carriage 3 is movably mounted on tracks 5 by means of rollers 4. In the lower part of carriage 3, a guide roller 6 is mounted, while further guide rollers 6a are rotatably mounted at the rear of a machine frame (not shown) which guide an endless belt 7 in cooperation with drive rollers 8 and a further tension roller 9. Tension roller 9 is rigidly connected at one point with chain 1. As can be seen in FIG. 3, a drive sprocket 10 communicates with an indexing mechanism, whereby a drive chain 11 is connected in a specific transmission ratio with sprockets 12 and 13. A chain 14 of sprocket 13 includes a guide pin 15 which engages an elongated guide slot 16 disposed in an upper portion of carriage 3.

According to FIG. 3, the switching mechanism in the specific embodiment comprises a cam plate 18 which is secured on a shaft 17, such that a cam portion thereof engages a pivotably mounted tripping mechanism 20 at a roller 19 of the latter. A wedge shaped portion 21 of the tripping mechanism 20 is correlated with the peripheral dimensions of a driving disc 22. Drive sprocket 10 and driving disc 22 are connected by means of a hub and are rotatably mounted on a drive shaft 23 on which a sprocket 24 and an arresting wheel 25 are secured. On driving disc 22, a catch 27 having a guiding pin 26 is pivotally mounted at pivot point 28. A reverse arresting means 29 is tangentially arranged with respect to the circumferential periphery of drive disc 22. Drive sprocket 10 is periodically switched in its rotation on and off by the switching mechanism.

FIG. 3 shows the switching mechanism shortly before switching off drive sprocket 10. After roller 19 of tripping mechanism 20 having passed the cam portion of cam plate 18, the wedge-shaped portion 21 is pivoted onto the circumferential periphery of driving disc 22. At that point, the rotational connection between driving disc 22 and drive shaft 23 is interrupted due to the fact that guide pin 26 engages catch 27 of arresting wheel 25 by means of the wedge-shaped portion 21 and renders drive sprocket 10 inoperative. Reverse arresting means 29 arrests drive disc 22, while drive shaft 23 together with sprocket 24 and arresting wheel 25 remain in constant rotation. The inoperative position of drive sprocket 10 occurs at a time when tension roller 9 is moved to the position shown in FIG. 1. The device is switched on when the cam portion of cam plate 18 engages roller 19, whereby the wedge-shaped portion 21 is moved laterally out of engagement with driving disc 22. Thereby, arresting catch 27 engages arresting wheel 25 and the rotational connection with drive sprocket 10 is reestablished.

The rotation of drive sprocket 10 is transferred through chain 14 by means of actuating chain 11 to sprockets 12 and 13, whereby the ratio of rotation is calculated with the consideration of the amount of links in chain 14, such that the guide pin 15 of chain 14 completes one full revolution between successive actuations of drive sprocket 10. In other words, carriage 3 performs one complete back and forth movement under each actuation of the drive sprocket 10 while belt 7 completes a delivery run. During the delivery run, belt 7 maintains its continuous movement by means of drive roller 8 and roller 6 as well as tension roller 9.

This invention should not, however, be limited to the specific embodiments shown by the appended drawings, but rather defined by the scope of the appended claims.

What is claimed is:

1. Apparatus for transporting workpieces from a loading station to a receiving station, said apparatus comprising: an endless belt; drive roller means operatively connected to said endless belt; driven chain means; a set of guide sprocket means operatively coupled to said driven chain means; tension roller means secured to said driven chain means and operatively coupled to said endless belt; carriage means secured to said driven chain means and adapted to move along a predetermined path therewith; guide means formed on said carriage means; a pair of driven sprockets laterally disposed with respect to each other along the path of movement of said carriage means; endless driven chain means carried by said pair of driven sprocket means; pin means secured to said endless driven chain means and adapted to cooperate with said guide means; driving sprocket means operatively connected to one of said pair of driven sprocket means; and switching means operatively connected to said drive sprocket means for effecting intermittent operation of said drive sprocket means, whereby said carriage means is reciprocated between two positions on said path in response to said intermittent operation of said drive sprocket means, said tension roller means and said endless belt passing therearound reciprocate between said loading and said receiving stations.

2. The apparatus according to claim 1, wherein said carriage means is slidably mounted on track means.

3. The apparatus according to claim 1, wherein said endless belt is guided by a plurality of guide rollers, one of said guide rollers being secured to said carriage means.

4. The apparatus according to claim 3, wherein the guide rollers adjacent said drive roller means are arranged such that said endless belt encompasses said drive roller means over a large angular dimension along the periphery thereof.

5. The apparatus according to claim 1, wherein said endless belt is continuously driven by said drive roller means.

References Cited by the Examiner
UNITED STATES PATENTS

| | | | |
|---|---|---|---|
| 1,130,568 | 3/1915 | Callow | 107—4.3 |
| 2,478,075 | 8/1949 | Baker | 107—1.8 |

EVON C. BLUNK, *Primary Examiner.*

R. E. AEGERTER, *Assistant Examiner.*